E. T. MASSEY.
EMBOSSED ARTICLE AND METHOD OF MAKING THE SAME.
APPLICATION FILED JAN. 12, 1918.
1,282,612.
Patented Oct. 22, 1918.
2 SHEETS—SHEET 1.
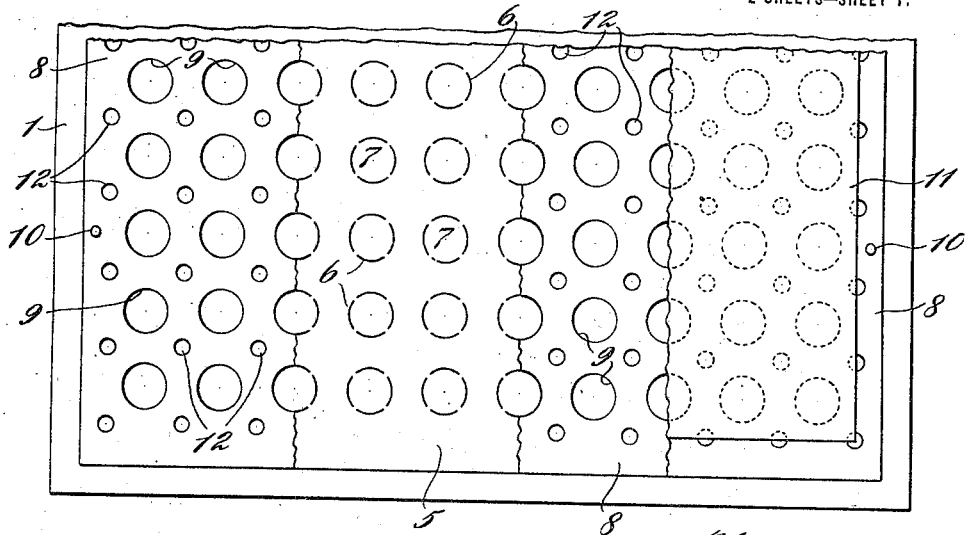
Fig. 1.
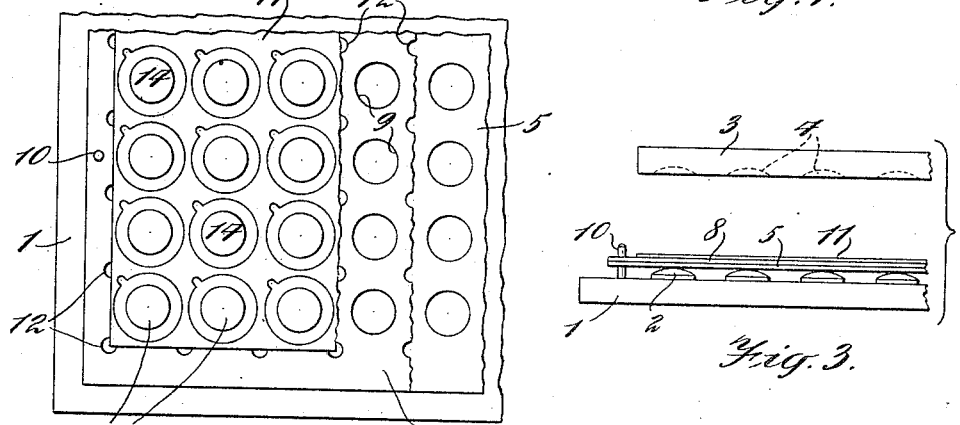
Fig. 2.
Fig. 3.
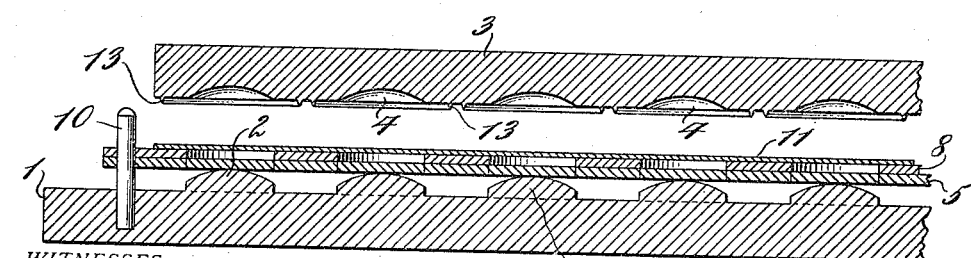
Fig. 4.
WITNESSES:
INVENTOR.
Edward T. Massey
BY
Rosenbaum, Stockbridge & Boret.
ATTORNEYS.

E. T. MASSEY.
EMBOSSED ARTICLE AND METHOD OF MAKING THE SAME.
APPLICATION FILED JAN. 12, 1918.
1,282,612.
Patented Oct. 22, 1918.
2 SHEETS—SHEET 2.
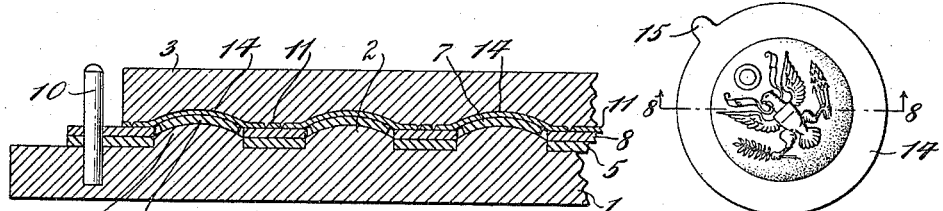
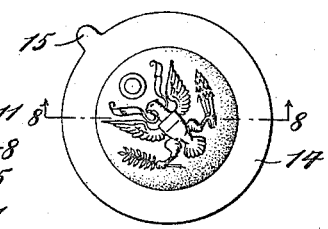
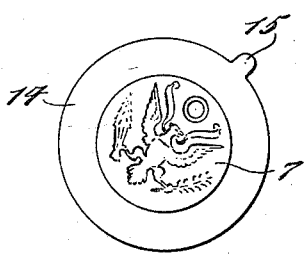
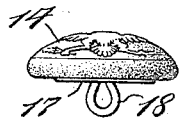
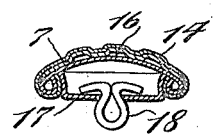
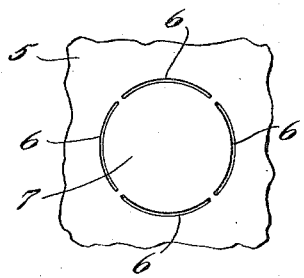
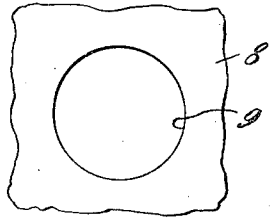
WITNESSES:
Geo. C. Cheney
INVENTOR.
Edward T. Massey
BY
Rosenbaum, Stockbridge and Rorer
ATTORNEYS

UNITED STATES PATENT OFFICE.

EDWARD T. MASSEY, OF NEW YORK, N. Y.

EMBOSSED ARTICLE AND METHOD OF MAKING THE SAME.

1,282,612.  Specification of Letters Patent.  Patented Oct. 22, 1918.

Application filed January 12, 1918. Serial No. 211,690.

*To all whom it may concern:*

Be it known that I, EDWARD T. MASSEY, a citizen of the United States, residing at the city of New York, in the borough of Queens and State of New York, have invented certain new and useful Improvements in Embossed Articles and Methods of Making the Same, of which the following is a full, clear, and exact description.
My invention relates to embossed articles and more particularly to buttons, although in its broader scope is not restricted thereto, and it comprehends a method of manufacture and the article produced thereby.
Heretofore in the manufacture of embossed buttons and similar articles, the embossing has usually been done upon sheet metal, and buttons and the like have been made by covering a hard and smooth supporting form or mold, of wood or metal, with an outer facing of fabric or the like without embossing, the production of embossed surfaces on cloth or the like not having been deemed commercially possible heretofore.

My invention therefore broadly includes the production on a flexible outer facing or covering, such as the usual cloth covering of covered buttons, of embossing which will be permanently retained, and I accomplish this result by, at a single operation, producing embossing through an outer covering or facing of comparatively flexible material, such as cloth, and concurrently through an inner reinforcing layer of stiffer material, such as cardboard. My invention includes adhesively securing together the inner reinforcing layer and the outer facing or covering, and also includes the application of adhesive only between the central embossed surfaces or parts, the covering or outer facing layer being of larger dimensions than the reinforcing backing layer so that the facing or covering has a flexible supporting part or margin which projects beyond the reinforcing layer. My invention further includes various details in the carrying out of the process and in the article produced thereby, as will appear from the following description.

In the accompanying drawings:

Figure 1 is a partial plan view of the bed plate, which is the male member of an embossing press with the several layers of different suitably prepared material which are to be acted upon shown as superposed thereupon and with parts thereof omitted;

Fig. 2 is a view similar to Fig. 1 after the embossing action has taken place;

Fig. 3 is a partial side elevation of the embossing press, showing the upper and lower die members as separated and the layers or sheets of material to be acted upon in position upon the latter, the thickness of these sheets being exaggerated for clearness;

Fig. 4 is an enlarged central longitudinal vertical section of what appears in Fig. 3;

Fig. 5 is a view similar to Fig. 4, but showing the embossing dies as having been brought together in their embossing action and what then takes place;

Fig. 6 is a further enlarged plan view of an embossed button blank or facing member, such as would be produced by the embossing action illustrated in Fig. 5;

Fig. 7 is an edge view of the button blank shown in Fig. 6;

Fig. 8 is a central section on a horizontal plane indicated by the line 8—8 of Fig. 6 as viewed from below;

Fig. 9 is a bottom plan view of the button blank;

Fig. 10 is a plan view of a covered and embossed button produced from the blank of Figs. 6 to 9;

Fig. 11 is an edge view of the button shown in Fig. 10;

Fig. 12 is a section on the line 12—12 of Fig. 10;

Fig. 13 is an enlarged plan view of a fragment of the backing sheet from which reinforcing disks are punched by the dies; and Fig. 14 is a similar view of a stencil sheet employed in carrying out my invention.

My improved method is designed for the production of an embossed facing member or blank adapted to serve as a covering in the manufacture of a covered embossed button, the said blank and the said button both embodying my invention.

A lower male die member 1 of an embossing press has formed thereon upwardly projecting dies 2, and an upper female die member 3 has formed in the lower side thereof matrices 4 corresponding to and alined with and complementary to the dies 2 of the lower die member 1. Upon the lower member 1 and resting upon the dies 2, are several superposed sheets or layers of suitably prepared material to be acted upon by the embossing dies, as appear in the drawings in Figs. 1, 3 and 4.

First at the bottom is a comparatively stiff backing sheet 5 of suitable material, such as cardboard, from which along weakened lines as indicated by the disconnected arcuate slits 6 (Figs. 1 and 13) backing pieces or reinforcing disks 7 have previously been partly cut, and these weakly attached disks 7 are in register or in alinement with the dies 2 on the underlying lower die member 1. The upper surface of the backing sheet 5 including the reinforcing disks 7 is covered with or has spread thereon a thin coat or layer of a suitable adhesive material, such as glue (not shown in the drawings), and upon this glued upper surface of the backing sheet 5 is placed a stencil sheet 8 having circular openings or holes 9 therein which coincide with or are in register with the weakly attached reinforcing disks 7 of the backing sheet 5. The stencil sheet 8 may be of the same material as the backing sheet 5, for example, cardboard, and the sheets 5 and 8 become adhesively attached together.

These superposed sheets 5 and 8 are maintained in proper accurate register with each other and with the dies 2 of the die member 1 by means of pins or studs 10 which project upward from the lower die member 1 adjacent to the opposite ends thereof (Figs. 1 to 5 inclusive) and pass with a snug fit through holes provided for the purpose in the sheets 5 and 8. It is to be understood that the backing sheet 5 is of such nature or of such material, such as stiff paper or cardboard coated with glue, that embossing produced upon the disks 7 will be permanently retained thereby. A facing layer or cover sheet 11 of suitable comparatively thin and flexible material, such as impregnated or rubberized cloth, is loosely laid upon the stencil sheet 8 having therein the circular holes 9. Between these larger holes 9 it is to be noted that the stencil sheet 8 is provided with small openings or perforations 12. It is also to be noted that each of the matrix-forming depressions 4 in the lower side of the upper die member 3 is surrounded at a suitably spaced distance therefrom by a downwardly projecting cutting ridge 13 (see Fig. 4).

When the upper die member 3 descends upon the lower die member 1, as appears in Fig. 5, the upwardly projecting dies 2 will punch the reinforcing disks or backing pieces 7 free from the inner sheet 5 along the weakened lines 6 and as the backing sheet 5, stencil sheet 8 and flexible facing sheet 11 are forced down by the descending die member 3, the backing pieces 7 will be forced through the holes 9 in the stencil sheet 8, and the thin flexible facing sheet 11 will be brought into contact with the upper glued surface of the disks 7. The rest of the lower surface of the facing sheet 11 will be protected from the glue on the backing sheet 5 by the interposed stencil sheet 8, excepting at the perforations 12 in the stencil sheet 8, at which points the lower surface of the facing sheet 11 will become attached to the upper surface of the backing sheet 5.

As the die members 1 and 3 are firmly pressed together, the backing disks 7 will be caused to firmly adhere to the lower side of the facing sheet 11 and concurrently the facing sheet 11 and the backing pieces 7 will be embossed between the dies 2 and 4 at a single operation, while the glue or like adhesive is soft and moist. Also concurrently with this embossing operation, the downwardly projecting circular cutting ridges 13 on the upper die member 3 will cut through the facing or covering sheet 11 so that facing pieces 14 of larger dimensions than the backing pieces 7 will thus be punched from the facing sheet 11. Each of these facing pieces 14 will carry a backing piece 7 firmly adhesively attached to the back thereof and the embossing of the stronger and stiffer backing piece 7 will support and reinforce the similar registering embossing on the outer thinner and more flexible facing piece 14, as will be readily understood. When the glue dries it will serve to stiffen the backing pieces and that part of the facing pieces with which it comes in contact and thereby aid in permanently fixing the embossing.

When the facing pieces are punched out from the facing sheet 11, as above described, the intermediate parts of this facing sheet will be left adhesively attached, through the perforations 12 in the stencil sheet 8, to the remnant of the backing sheet 5 from which the backing disks 7 were punched, so that all of this waste material is connected together in a single piece for convenience of disposition. It should be particularly noted that the facing piece 14, together with the embossed reinforcing disk 7 adhesively secured to the embossed center thereof, forms a facing member or blank adapted to be employed as a covering for a covered button, and that the margin of the facing piece 14 projecting peripherally outward from the backing disk 7 is free from adhesive and therefore retains all its original flexibility so as thereby to be well adapted for attachment to the other parts of the button in a usual or any suitable way for thereby supporting or holding this embossed facing member in place. A laterally projecting position-determining lug 15 is provided on the edge of the flexible facing piece 14 for convenience in manufacturing in correctly placing the embossed design in proper relation to the other parts of the button, such as in relation to a usual eye which is always attached to a garment in a horizontal plane so that the embossed design, in order that it may be always upright, should be applied to the button at right angles to the plane of the eye. It is to be noted that the above described button cover or facing member is an article of manufacture in itself, and is produced by the novel method or process hereinbefore described.

The method of manufacture pursued in the making of buttons employing the embossed facing member or covering of my invention, may be the same as heretofore employed in the manufacture of covered buttons having no embossing thereon, and the form or mold which supports the covering at the back may be of any suitable material, such as those of wood or of metal heretofore used. In the covered embossed button embodying my invention illustrated in Figs. 10, 11 and 12 of the drawings, a smooth sheet metal form or mold 16 is employed which supports the covering at the back of the embossed reinforcing disk 7 and over the rounded edge of which the flexible attaching marginal portion of the facing piece 14 is folded, as appears in the drawings, particularly in Fig. 12. This button has a usual metal back 17 which fits in a usual way within the entwined circular edge of the form or mold 16 and thereby clamps in place the flexible margin of the centrally embossed facing piece 14. The back 17 is provided with a usual projecting eye 18 relatively to which the embossed design on the facing member is properly positioned by the aid of the projecting positioning lug 15, as hereinbefore described.

It is obvious that various modifications may be made in the method described and in the articles produced thereby without departing from the spirit or principle of my invention, and I do not wish to be limited to any particular details of construction or features of operation except as they are defined in the claims.

I claim:

1. The method of producing an embossed article from an outer layer of textile material and an inner backing layer of flexible, relatively stiff, fibrous material of smaller dimensions, which consists in applying moist adhesive material to the upper surface of the backing layer, placing said upper surface centrally in contact with the lower surface of the outer layer and embossing and adhesively securing both layers together at a single operation, while the adhesive is still moist, whereby the central embossed part of the outer layer is reinforced and stiffened by the inner backing layer and both layers are stiffened by the adhesive material, and the outer marginal part of the outer layer is left flexible and free from adhesive.

2. The method of producing an embossed article which consists in placing a stencil sheet having openings therein in contact with a backing sheet of comparatively stiff material having an adhesive on its surface next to the stencil sheet and being weakened along lines in register with the openings in the stencil sheet, placing a flexible facing sheet in contact with the exposed side of the stencil sheet, punching out reinforcing backing pieces from the stiffer backing sheet along the weakened lines and causing them to adhere to the back of the facing sheet and embossing the backing pieces and the facing sheet, all at a single operation, whereby the stencil sheet prevents the back of the facing sheet around the margins of the backing pieces from coming into contact with the adhesive on the backing sheet and thereby leaves these margins in a flexible condition.

3. The invention claimed in claim 2 in which concurrently with the embossing operation facing pieces of larger dimensions than the backing pieces are punched from the facing sheet which have the backing pieces adherently attached thereto and beyond which a flexible margin free from adhesive projects from each of the facing pieces.

4. The invention claimed in claim 3 in which at points between the punched out backing pieces and also between the punched out facing pieces the back of the facing sheet is caused to adhere to the backing sheet through openings provided for this purpose in the stencil sheet, whereby all of the waste material will be connected together to form a single piece for convenient handling.

5. An embossed blank comprising an embossed facing piece of flexible textile material, an embossed backing piece of flexible, relatively stiffer fibrous material of smaller dimensions, the embossing in the backing piece conforming to the embossing in the facing piece, adhesive between the two pieces, the adhesive and the embossing in the backing piece reinforcing and stiffening the embossing in the facing piece, and the facing piece having a flexible marginal flange free from adhesive and projecting beyond the reinforcing backing piece and having a laterally projecting, position-determining lug.

6. An embossed blank comprising an embossed backing piece of comparatively stiff material, and a facing piece of more flexible material having embossing conformed to and reinforced by the embossing of the backing piece, the backing piece and the facing piece being adhesively secured together and the facing piece having a flexible marginal part free from adhesive and projecting beyond the reinforcing backing piece, the flexible facing piece having a laterally projecting position-determining lug.

7. In a button composed of a rigid two-part form or mold, the combination with a cloth covering for the top of the mold, of a paper disk of smaller dimensions than the cloth covering centrally adhesively attached to the back of the cloth covering, an annular marginal portion of the cloth covering free from adhesive surrounding the paper disk, said cloth covering and paper disk being embossed and being stiffened by the adhesive material, said cloth cover being attached to the top of the mold by folding in said marginal portion and clamping the same between the two parts of the mold.

In witness whereof, I subscribe my signature.

EDWARD T. MASSEY.

Copies of this patent may be obtained for five cents each, by addressing the "Commissioner of Patents, Washington, D. C."